(12) United States Patent
Laghi et al.

(10) Patent No.: US 11,041,282 B2
(45) Date of Patent: Jun. 22, 2021

(54) EXCAVATION TOOL FOR MAKING DIAPHRAGMS AND RELATED EXCAVATION EQUIPMENT

(71) Applicant: SOILMEC S.P.A., Cesena (IT)

(72) Inventors: Matteo Laghi, Forlì (IT); Pietro Fontana, Cesena (IT); Jasmin Curic, San Mauro Pascoli (IT); Daniele Villa, Rimini (IT); Mirco Armando Raffuzzi, Cervia (IT); Francesco Mantovani, Cesena (IT)

(73) Assignee: SOILMEC S.P.A., Cesena (IT)

( * ) Notice: Subject to any disclaimer, the term of this patent is extended or adjusted under 35 U.S.C. 154(b) by 385 days.

(21) Appl. No.: 16/153,059

(22) Filed: Oct. 5, 2018

(65) Prior Publication Data

US 2019/0106855 A1    Apr. 11, 2019

(30) Foreign Application Priority Data

Oct. 6, 2017 (IT) .......................... 102017000112156

(51) Int. Cl.
*E02D 17/13* (2006.01)
*E02F 3/20* (2006.01)
(Continued)

(52) U.S. Cl.
CPC .............. *E02D 17/13* (2013.01); *E02F 3/205* (2013.01); *E02F 3/246* (2013.01); *E02F 3/26* (2013.01);
(Continued)

(58) Field of Classification Search
CPC .......... E02D 17/13; E02D 17/02; E02F 3/205; E02F 3/246; E02F 3/26; E02F 3/241; F16H 1/32; F16H 1/46; E21B 3/02
See application file for complete search history.

(56) References Cited

U.S. PATENT DOCUMENTS 4,172,616 A    10/1979  Delli-Gatti, Jr.
5,158,126 A *  10/1992  Lang .................... A01G 23/067
                                                144/24.12
(Continued)

FOREIGN PATENT DOCUMENTS

DE    3608657    9/1986
FR    2604460    4/1988
(Continued)

OTHER PUBLICATIONS

Italian Search Report and Written Opinion from Italian Application No. 201700112156, completed May 23, 2018.

*Primary Examiner* — Jessica H Lutz

(74) *Attorney, Agent, or Firm* — Merchant & Gould P.C.

(57) ABSTRACT

An excavation tool for making ground excavations for panels and diaphragms includes at least one rotary excavation drum. At least one frame is adapted to support the excavation drum. At least one pump is adapted for suction of an excavation fluid. A brushless electric motor is adapted to put in rotation the at least one excavation drum. At least one mechanical reducer is operationally connected to the electric motor and the at least one excavation drum. The electric motor is installed in the frame and coaxial to the at least one excavation drum. The at least one mechanical reducer is coaxial to the electric motor and the at least one excavation drum. The at least one mechanical reducer is adapted to transfer rotary motion from the electric motor to the at least one excavation drum.

23 Claims, 9 Drawing Sheets

(51) Int. Cl.
  *F16H 1/46* (2006.01)
  *E02F 3/26* (2006.01)
  *F16H 1/32* (2006.01)
  *E02F 3/24* (2006.01)
  *E02F 3/92* (2006.01)

(52) U.S. Cl.
  CPC ............ *E02F 3/9237* (2013.01); *F16H 1/32* (2013.01); *F16H 1/46* (2013.01)

(56) References Cited

U.S. PATENT DOCUMENTS

| | | | |
|---|---|---|---|
| 5,975,644 A * | 11/1999 | Lang | A01G 23/067 |
| | | | 144/24.12 |
| 6,626,500 B1 * | 9/2003 | Cribb | E02F 3/246 |
| | | | 299/78 |
| 2009/0022584 A1 * | 1/2009 | Braghittoni | E02D 19/18 |
| | | | 415/206 |
| 2019/0323205 A1 * | 10/2019 | Bernasinski | E02F 3/246 |

FOREIGN PATENT DOCUMENTS

| | | | |
|---|---|---|---|
| GB | 2075577 A | 11/1981 | |
| JP | 4-97019 A | 3/1992 | |
| JP | 7-113244 A | 5/1995 | |
| JP | 8-100440 A | 4/1996 | |
| JP | 2990236 | 10/1999 | |

* cited by examiner

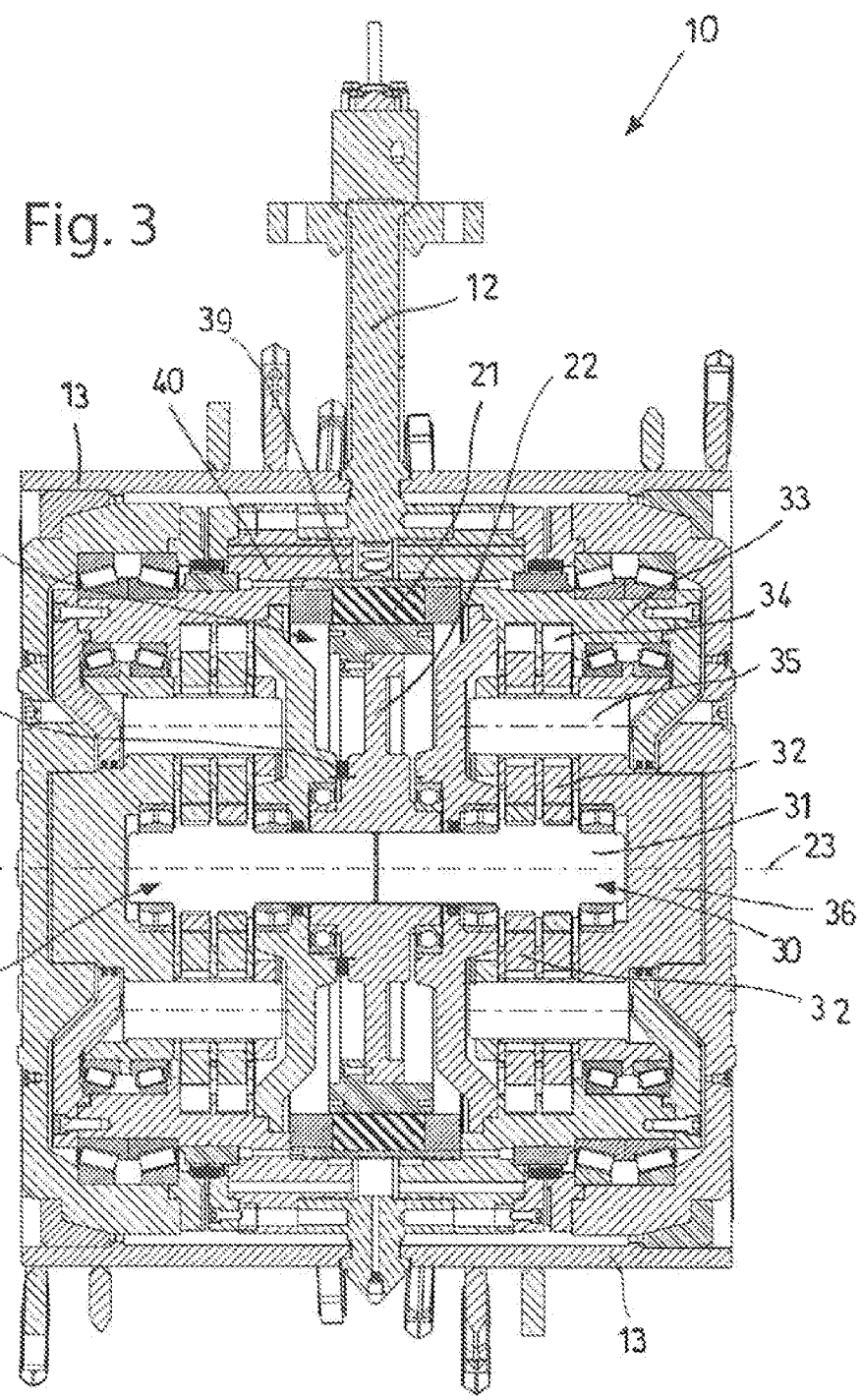

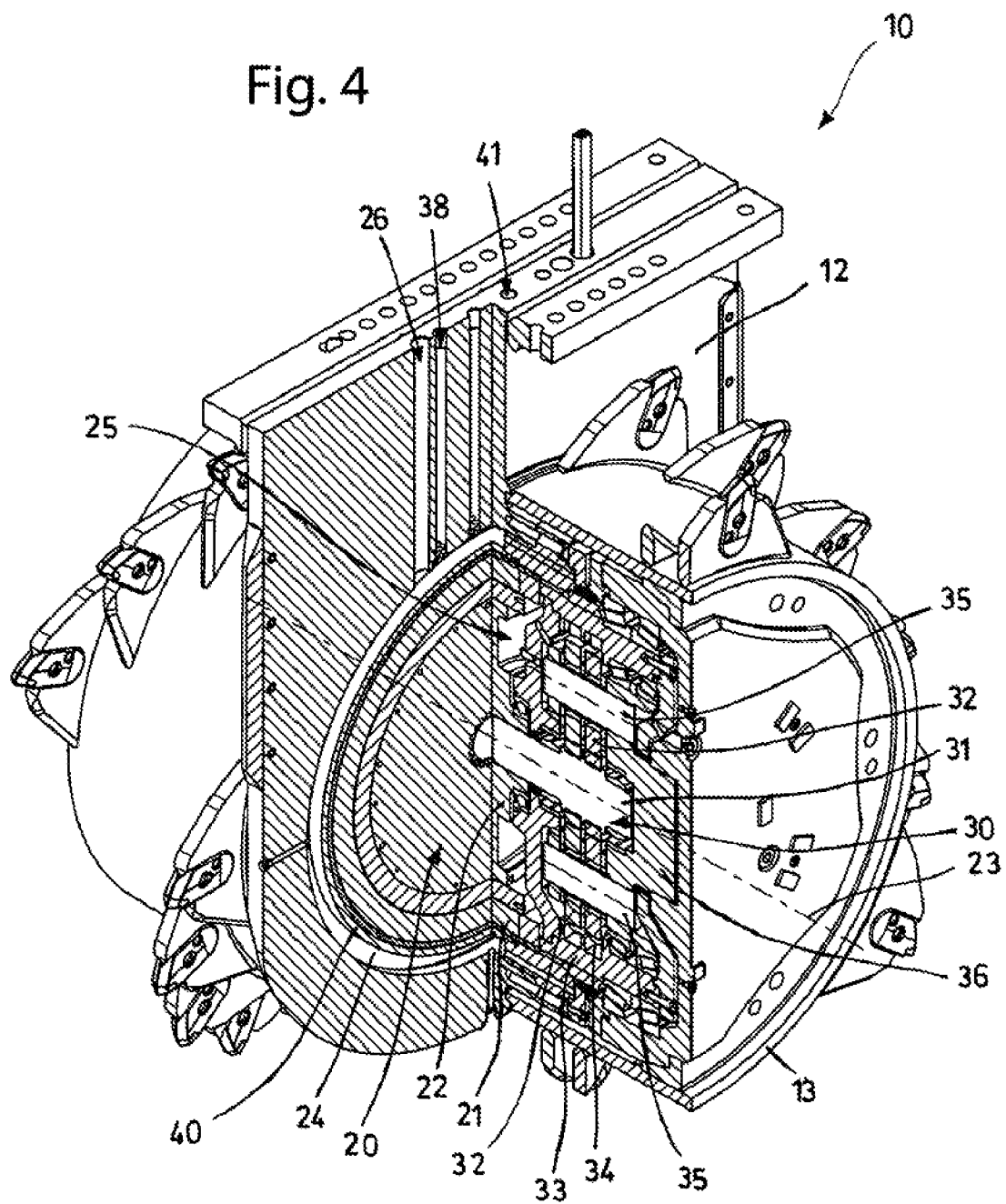

EXCAVATION TOOL FOR MAKING DIAPHRAGMS AND RELATED EXCAVATION EQUIPMENT

This application claims benefit of Ser. No. 102017000112156, filed 6 Oct. 2017 in Italy and which application is incorporated herein by reference. To the extent appropriate, a claim of priority is made to the above disclosed applications.

BACKGROUND OF THE INVENTION

The present invention relates to an excavation tool, in particular a cutter, for making ground excavations in which panels or diaphragms, preferably deep ones, can be built. Such excavation tool is advantageously supported and moved by a crane or a rope excavator or a drilling machine, generically referred to as excavation equipment.

In the ground drilling field, it is known that excavation devices, such as cutters, are moved through a rope-type device, e.g. a draw-works, for the purpose of making ground excavations having a substantially rectangular cross-section down to a depth of a few hundred metres. The panels built in such excavations may have structural functions as foundation elements or waterproofing functions. While making the excavation, the excavation itself is kept full of excavation fluid or stabilizing mud, which, due to the pressure thus generated, performs the function of supporting the walls of the already excavated part, preventing them from collapsing. Excavation fluids or stabilizing muds are generally mixtures containing bentonite or polymers. The excavation tool is therefore immersed in the excavation fluid or stabilizing mud during the execution of the excavation. Subsequently, once the excavation tool has been extracted, said excavations are filled with hardening material, e.g. concrete, and possibly also with reinforcing elements, e.g. metal cages, in order to obtain panels or diaphragms in the ground.

One example of excavation equipment comprising an excavation tool of a known type for making deep excavations for the creation of diaphragms is shown in FIG. 1. In said FIG. 1 the excavation equipment is indicated as a whole by reference numeral 100. excavation equipment 100 can be essentially divided into a base machine 102 and an excavation tool 103 supported by base machine 102. base machine 102 is generally constituted by a tracked undercarriage 104; a turret 105 rotatable relative to tracked undercarriage 104, and an arm 106, generally tilting and hinged to turret 105, which supports excavation tool 103. Said arm 106 supports excavation tool 103 through a flexible suspension element 107 that can be wound and unwound through a draw-works 108. base machine 102 performs the task of maneuvering excavation tool 103, positioning it on the excavation point, and supplying to said excavation tool 103 the power necessary for excavating the ground.

Base machine 102 performs also numerous service functions, among which the following ones are of fundamental importance: translating excavation equipment 100; handling arm 106 and turret 105 for positioning excavation tool 103, and rotating draw-works 108 (not shown) for winding or unwinding flexible suspension element 107 in order to lift or lower excavation tool 103 in the pit. Excavation tool 103 generally consists of a cutter, which comprises a prismatic load-bearing frame 109, to the base of which a cutting head 110 is secured. The cutting head may comprise one or more frames 112 for supporting excavation drums 113, such excavation drums being also referred to as excavation wheels. Excavation drums 113 are fitted with cutting teeth around their circumference and can rotate about parallel axes, driven independently by means of respective rotary motors, generally hydraulic ones. The motors driving excavation drums 113 may be either integrated into excavation drums 113 themselves or installed externally thereto in an offset position, e.g. fastened to the prismatic load-bearing frame 109 or to cutting head 110, in which case they will require the presence of a mechanical transmission connecting them to said excavation drums 113.

Excavation drums 113 break up, in particular cut and crumble, the ground, ensuring that the pit will have a rectangular cross-section. The detritus crushed by the teeth into sufficiently small pieces is ejected from the pit and conveyed towards the ground surface by means of a submerged suction pump 114, also fixed to prismatic load-bearing frame 109 of excavation tool 103, which discharges it together with the excavation fluid or stabilizing mud that fills the pit. The excavation fluid can therefore perform both a detritus transport function and a pit-wall stabilization function. As it comes to surface through mud pipe 115 under the thrust exerted by pump 114, the excavation fluid is delivered to suitable systems that provide for separating the solid part in suspension, while the liquid fraction is delivered again into the pit in order to keep the latter constantly full. In this way, excavation tool 103 advances and removes soil until it arrives at the design depth, which in the heaviest applications may even exceed 200 metres.

The cross-section dimensions of diaphragm panels are rather standardized, i.e. a range of widespread sizes can be defined which can be considered as "typical" for this type of foundation. Generally the rectangular cross-section of a diaphragm pit has it major side, also called length, that may vary between 2,500 mm and 3,000 mm, and its minor side, also called width, that may vary between 800 mm and 1,000 mm. On the contrary, the pit depth may vary extensively as a function of the site conformation and of the type of soil in which the excavation is made; in fact, the depth may range from a few tens of metres to a few hundred metres. A typical operating range can also be defined as concerns the revolution speed of the excavation drums of the excavation tool, which may vary from a few revolutions per minute, e.g. 1 or 2 revolutions per minute, to a maximum value of sixty revolutions per minute. In this case as well, the optimal speed of the excavation wheels will change according to the consistency of the soil.

According to the current state of the art, the excavation wheels of excavation tools, in particular cutters, are moved by hydraulic motors that, through interposition of speed reducers, transfer rotary motion and torque to the wheels. In turn, the hydraulic motors receive the necessary hydraulic power through pressurized oil, conveyed through suitable hydraulic power lines that transfer hydraulic power from the base machine to the excavation tool. In FIG. 1, which illustrates the prior art, one can see that excavation tool 103 is connected to base machine 102 through power-line supporting and guiding devices 116. Such supporting and guiding devices 116 are wound on and unwound from a reel 117 in order to follow the movement of the excavation tool during the excavation and lift phases. Such power-line supporting and guiding devices 116 contain hydraulic hoses that allow transmitting a given oil flow-rate, and in general a given hydraulic power, from base machine 102 to the motors and to the hydraulic actuators of the cutter. The power-line supporting and guiding devices 116 may also contain electric cables or signal cables. The hydraulic power needed for driving the excavation tool is therefore generated in the base machine, which lies on the ground, outside the pit. Generally, the power to be supplied to the excavation tool is generated by a hydraulic power unit 118, also referred to as hydraulic power-pack 118, installed on rotary turret 105 of base machine 102. Said hydraulic power-pack unit comprises a power motor, generally a Diesel engine, an oil tank, a pump assembly which, when the pumps are activated by the motor, deliver pressurized oil from the tank to the hydraulic hoses of the excavation tool's power lines. The power-line supporting and guiding devices 116 must therefore be longer than the maximum depth that can be reached by the excavation tool, and must be wound on a power-line reel 117. The oil that is delivered by hydraulic power unit 118 towards excavation tool 102 must thus run through the entire length of the hoses contained in the power-line supporting and guiding devices 116, independently of the actual depth reached by excavation tool 103 and/or of the extent to which said hoses are wound on power-line reel 117. In one variant, the hydraulic power to be supplied to the excavation tool can be generated directly by the motor and by the pumps contained in the turret of the base machine, if said base machine has been expressly designed for cutter applications or for applications with another excavation tool.

A typical problem suffered by excavation equipment like that shown in FIG. 1 lies in the fact that, because of the considerable load losses undergone by the oil while flowing through the hydraulic power lines of the excavation tool, most of the energy made available by hydraulic power unit 118 is dissipated into friction and heat before it reaches the hydraulic motors of the excavation wheels, installed on excavation tool 103. This energy dissipation limits the efficiency of excavation tool 103, in that the power actually available at the motors of the excavation wheels is much less than the hydraulic power generated by power unit 118 or anyway by the base machine. Such energy dissipation implies economical losses and excessive fuel consumption, resulting in a greater environmental impact.

In order to limit the problem of energy dissipation in hydraulic lines, one solution that is often adopted envisages the use of hoses of bigger diameter, but this involves the following drawbacks: increased dimensions of the power-line supporting and guiding devices 116; increased minimum radius for winding the hoses, requiring a bigger reel 117. This turns out to be disadvantageous, in that it becomes more complex to position the reel on base machine 102, due to the limited room available. In addition, such a solution increases the weight of the reel and base machine, resulting in further problems that are well-known to the person skilled in the art. Notwithstanding all the above measures for loss reduction, such losses are still considerable and can be estimated to reduce the efficiency by a few tens of percentage points.

Another problem of prior-art cutters or excavation tools lies in the fact that they require that a high starting torque be supplied to the excavation wheels or drums, which condition is often not adequately met by the known drive motors currently installed on cutters; in fact, during the excavation it may happen that the rotation of the excavation wheels needs to be temporarily stopped, and when one wants to restart the rotation said wheels are caught in the excavation fluid and suspended detritus, so that a high initial friction must be overcome for them to begin to turn again. Fast hydraulic rotary motors are characterized by a low torque output at low rpm, which may be insufficient to restart the wheels, and are therefore quite unsuitable for this application. One solution that has been adopted in order to overcome these problems is the use of hydraulic motors with radial pistons, which have a high starting torque at low rpm.

However, the use of such motors involves other technical problems related to construction complexity and maintenance intervals, which must be very frequent, also because of the poor robustness of these motors when used for excavation applications, wherein the excavation wheels are subject to strong vibrations and shocks that are then transmitted to the motors.

The use of electric motors, such as, for example, brushed motors or asynchronous induction motors, although envisaged in the past, has found no application on excavation tools intended for diaphragm construction, because of some intrinsic limitations of brushed electric motors. In particular, considering a brushed or asynchronous induction electric motor with a torque output equalling that of the hydraulic motors with radial pistons currently in use, its dimensions will be remarkably bigger than those of the hydraulic motor. In particular, such bigger dimensions of the electric motor will not be compatible with the typical dimensions of diaphragm excavations, and it will not be possible to accommodate such motors in the prismatic load-bearing frame or in the cutting head of the cutter.

In order to overcome the problem of space occupation and overall weight of the excavation tool, it might be envisaged to employ fast electric motors, whether brushed or induction ones, which are characterized by a smaller diameter and lower torque than those of slow motors. The cutting head would thus be lighter, but the maximum torque generated by the motor would be lower, thus considerably reducing the performance of the excavation tool.

Furthermore, since the excavation wheels need higher torque values than those provided by fast electric motors and lower rpm values than those provided by fast electric motors, it would be necessary to interpose reducers between the motors and the wheels. Such reducers should have high transmission ratios, which would require a construction with at least two reduction stages. This constructive solution would imply: bigger axial dimensions of the motor-reducer assembly; lower efficiency of the reducer; greater complexity as regards reducer construction and assembly.

SUMMARY OF THE INVENTION

The object of the present invention is therefore to provide an excavation tool for making excavations for deep panels or diaphragms, wherein said excavation tool can overcome the above-mentioned drawbacks of the prior art in a simple, economical and functional manner.

More in detail, it is one object of the present invention to provide an excavation tool which is not subject to load loss problems due to friction in the hydraulic power lines of the motors, for the purpose of obtaining better efficiency compared to the state of the art, along with higher excavation performance due to increased power available at the excavation wheels, higher reliability, reduced maintenance intervals, simpler construction and higher versatility.

These technical effects are achieved through an excavation tool for making ground excavations for deep panels or diaphragms.

A further aspect of the present invention relates to excavation equipment.

Further features of the invention are set out herein.

BRIEF DESCRIPTION OF THE DRAWINGS

The features and advantages of an excavation tool and an excavation equipment for making deep panels and diaphragms according to the present invention will become more apparent from the following exemplificative and non-limiting description and from the annexed drawings, wherein:

FIG. 3 is a sectional view of a portion of the cutting head of the excavation tool according to the present invention;

FIG. 4 shows a perspective view, partially sectioned along a vertical plane, of a cutting head of the excavation tool according to the present invention;

DETAILED DESCRIPTION OF THE PREFERRED EMBODIMENTS

Figure 1:
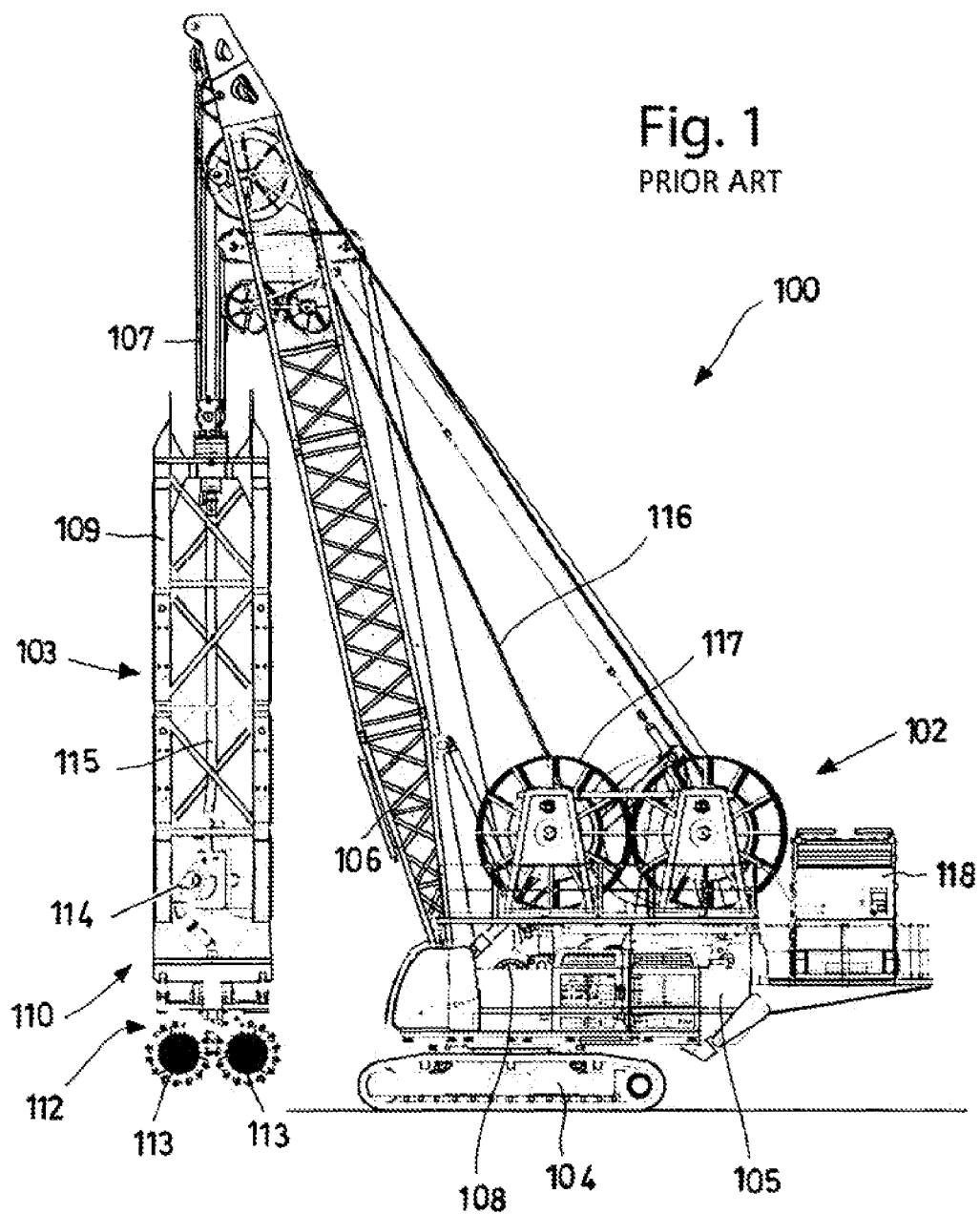
FIG. 1 is a side view of a known excavation equipment for making excavations for diaphragms, consisting of an excavation tool of a known type supported by a base machine or crane of a known type.

With reference to the above-mentioned drawings, the excavation tool according to the present invention is designated as a whole by reference numeral 3.

Excavation tool 3 according to the present invention is particularly suitable for making ground excavations in which diaphragms can be built.

Said excavation tool 3 comprises at least one rotary excavation drum 13 and at least one frame 12.

Said frame 12 is adapted to support said at least one excavation drum 13.

Excavation tool 3 according to the present invention comprises at least one pump 14, which is adapted for suction of an excavation fluid.

Excavation tool 3 according to the present invention further comprises at least one electric motor 20.

Said at least one electric motor 20 is advantageously of the brushless type.

Said at least one electric motor 20 is adapted to put in rotation said at least one excavation drum 13.

Excavation tool 3 according to the present invention further comprises at least one mechanical reducer (30, 50), operationally connected to said at least one electric motor 20 and said at least one excavation drum 13.

Said at least one electric motor 20 is installed in said frame 12 and is coaxial to said at least one excavation drum 13.

Said at least one mechanical reducer (30, 50) is adapted to transfer the rotary motion from said at least one electric motor 20 to said at least one excavation drum 13.

Excavation tool 3 according to the present invention is particularly suitable for being supported by an excavation equipment 1 adapted for making excavations for deep diaphragms.

Figure 2A:
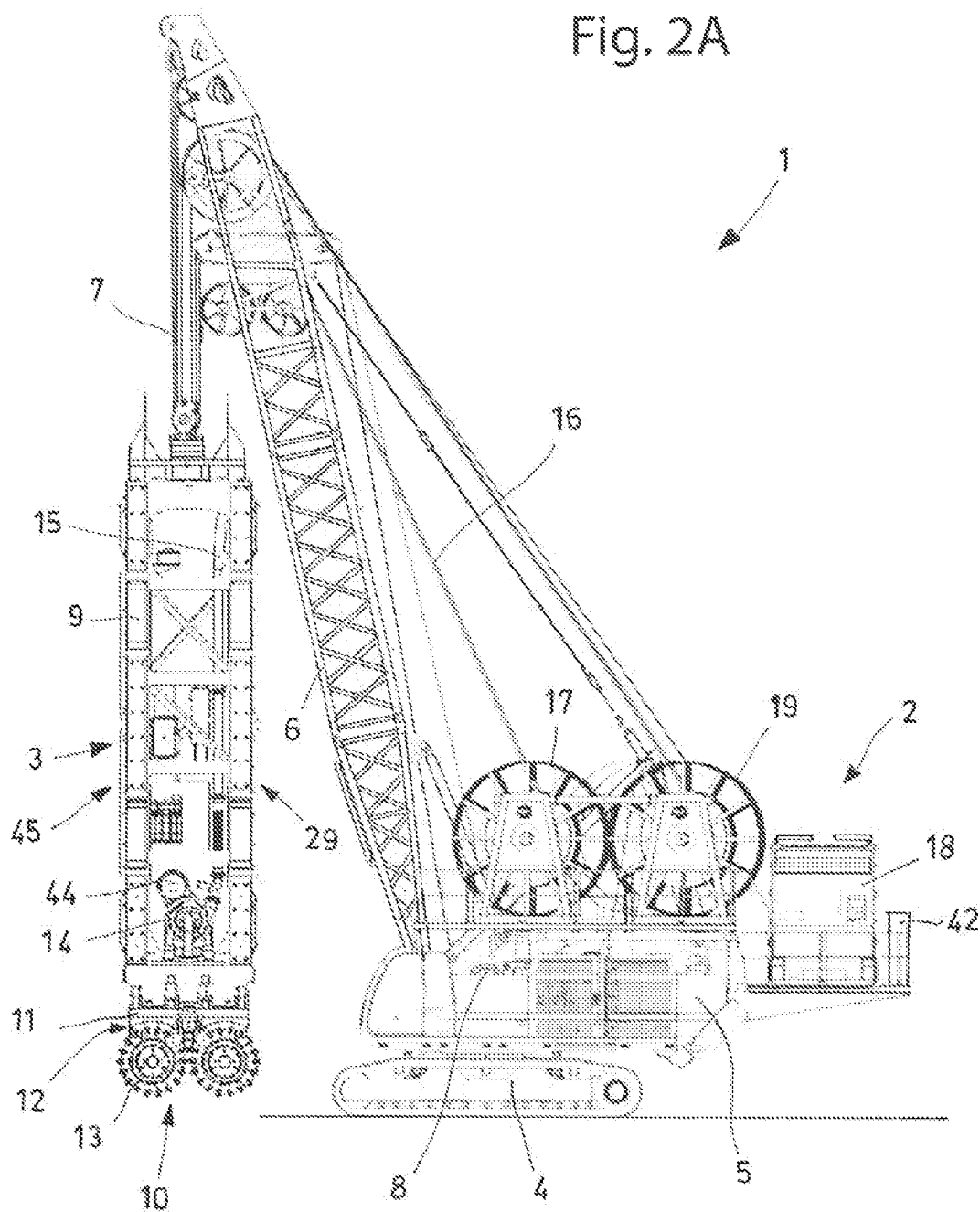
FIG. 2A is a side view of an excavation equipment according to the present invention for making excavations for diaphragms, consisting of an excavation tool according to the present invention supported by a base machine according to the present invention.

One example of excavation equipment 1 according to the present invention is shown in FIG. 2A. Excavation equipment 1 can be mainly divided into a base machine 2 and at least one excavation tool 3, the latter being supported by base machine 2. Base machine 2 is generally constituted by a tracked undercarriage 4, a turret 5 rotatable relative to tracked undercarriage 4, and an arm 6, generally tilting and hinged to turret 5; such a machine is particularly suitable for supporting excavation tool 3, e.g. by means of a flexible suspension element 7 or through a rigid supporting and guiding element.

Said suspension element 7 can, for example, be wound on or unwound from a drum comprised in a draw-works 8. Base machine 2 performs the task of maneuvering excavation tool 3, positioning it on the excavation point, and supplying to said excavation tool 3 the power necessary for excavating the ground.

Base machine 2 performs also a number of service functions, the most important of which are the following: translating excavation equipment 1; handling arm 6 and turret 5 for positioning excavation tool 3, and rotating draw-works 8 (not shown) for winding or unwinding suspension element 7 in order to lift or lower excavation tool 3 in the pit.

Excavation tool 3 generally consists of a cutter.

In one possible exemplary but non-limiting embodiment, said excavation tool 3 further comprises a load-bearing frame 9, preferably having a prismatic shape.

Preferably, to the base of load-bearing frame 9 a connection structure 11 is fixed, the latter being adapted to allow the connection of one or more cutting heads 10 to load-bearing frame 9. Each cutting head 10 comprises at least one frame 12 arranged to support one or more excavation drums 13. As an alternative, one or more cutting heads 10 are connected below said load-bearing frame 9.

In a preferred but non-limiting embodiment, the excavation tool according to the present invention comprises: a load-bearing frame 9; two cutting heads 10 fixed below said load-bearing frame 9. Said cutting heads 10 are arranged side by side.

Each cutting head 10 comprises a frame 12 adapted to support two excavation drums 13.

For each cutting head 10, excavation drums 13 are arranged on the same axis of rotation, opposite to each other with respect to frame 12.

For the purposes of the present description, the phrase "cutting heads 10 arranged side by side" means that the axis of rotation of the drums of a first cutting head 10 is parallel to the axis of rotation of the drums of a second cutting head 10.

In order to allow structure 11 to be connected to load-bearing frame 9, connection structure 11 may be fitted with flanges for a rigid connection, e.g. by means of bolts, to load-bearing frame 9. In an alternative but non-limiting embodiment, connection structure 11 may be fitted with hinges, the latter being adapted to allow a jointed connection to load-bearing frame 9, so that the at least one cutting head 10 and/or the at least one excavation drum 13 can be tilted relative to load-bearing frame 9, turning about such hinges.

Said frame 12, which is adapted to support said at least one excavation drum 13, is prearranged for being fixed to said connection structure 11.

In general, said frame 12, comprised in an excavation tool 3, is known in the industry as "PATIN".

Said frame 12 has such a structure and shape that said at least one excavation drum 13 can rotate about an axis, preferably a horizontal one. Said frame 12 houses, in a suitable housing, said at least one electric motor 20 capable of driving said at least one excavation drum 13.

Figure 2B:
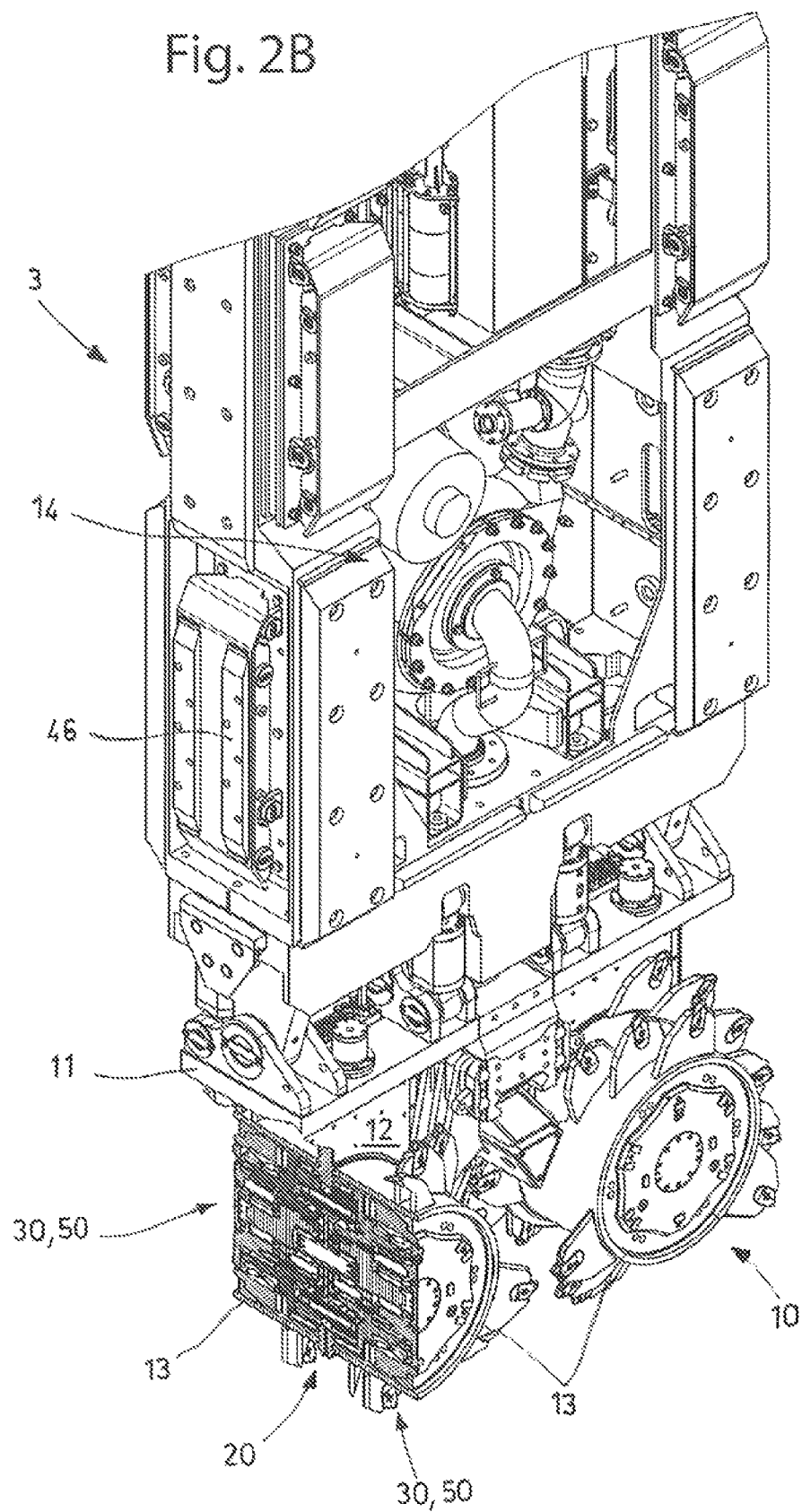
FIG. 2B shows an axonometric view of a portion of the excavation tool according to the present invention, wherein one can see the cross-section of a cutting head comprised in the excavation tool, which comprises an electric motor and a mechanical reducer, according to the present invention.

In the exemplary but non-limiting embodiment shown in FIG. 2, excavation tool 3 has a connection structure 11 hinged to load-bearing frame 9 of cutting tool 3. Under said connection structure 11 two cutting heads 10 are fixed, arranged side by side. Each cutting head 10 has a frame 12, adapted to support two excavation drums 13. For the purposes of the present description, said frame 12 may also be referred to as drum-carrying frame. Said excavation drums 13 are arranged on the same axis of rotation, but opposite to each other with respect to frame 12, as will be further explained hereinafter with reference to FIG. 3. In the implementation shown in FIG. 2, excavation tool 3 comprises, therefore, four excavation drums 13 arranged on two parallel axes of rotation, so that two excavation drums 13 are installed on each axis of rotation. Each pair of excavation drums 13 of each cutting head 10, installed on the same axis, is put in rotation by one electric motor 20, independently of the other pairs of excavation drums 13 belonging to other cutting heads 10 possibly present in excavation tool 3. Excavation drums 13, also called excavation wheels, are equipped with cutting teeth on their peripheral circumference. During the rotation of excavation drums 13, said cutting teeth break up, and preferably cut and crumble, the soil, while ensuring that the pit will have a rectangular cross-section. The detritus crushed into sufficiently small pieces by the cutting teeth of excavation drums 13 are ejected from the pit and conveyed towards the ground surface by means of a submerged suction pump 14, also secured to load-bearing frame 9 of the excavation tool 3. Said pump 14 is adapted to suck in the sufficiently small detritus together with the excavation fluid that fills the pit. Said excavation fluid is adapted to stabilize the walls of the pit being excavated. The excavation fluid can therefore perform both a detritus transport function and a pit-wall stabilization function. As it comes to the surface through a pipe 15, adapted to drain away the excavation fluid through pump 14, the excavation fluid is delivered to suitable treatment systems. Said systems provide for separating the solid part in suspension, while the liquid fraction is delivered again into the pit in order to keep the latter constantly full. In this way, excavation tool 3 advances and removes soil until it arrives at the design depth, which in the heaviest applications may even exceed 200 metres.

FIG. 3 shows a sectional view of cutting head 10 according to the present invention. In particular, the section lies in a plane passing through an axis of rotation 23 of excavation drums 13, coinciding with the axis of rotation of electric motor 20.

As can be seen in the above-mentioned figure, frame 12 has a housing, the shape of which is preferably cylindrical. Said housing defines a first chamber 24. In said first chamber 24 electric motor 20 is housed, which is adapted to drive excavation drums 13. In particular, in excavation tool 3 according to the present invention electric motor 20 is a brushless motor, preferably a synchronous motor with permanent magnets, also referred to as torque-motor.

Merely by way of example, said brushless electric motor 20 is, according to the state of the art, a motor capable of operating at a constant working torque at revolution speeds up to 700-1,000 rpm.

In general, electric motor 20 adapted to drive excavation drums 13 comprises a stator 21, preferably cylindrical in shape. Said stator 21 contains electric windings.

Electric motor 20 comprises also a rotor 22, preferably having a shape complementary to the shape of stator 21.

Said rotor 22, arranged coaxial to stator 21, comprises permanent magnets.

Stator 21 is fixedly fastened to frame 12, and therefore it does not rotate.

Rotor 22 is mounted coaxial to stator 21 through suitable bearings. Said rotor 22 is adapted to rotate about an axis. Said axis coincides with said axis of rotation 23, about which said excavation drums 13 rotate.

In a first embodiment of electric motor 20, said stator 21 is arranged externally to said rotor 22, wherein shape of the stator 21 is adapted to match the shape of said first chamber 24.

In an alternative embodiment of electric motor 20, said stator 21 is arranged internally to said rotor 22. In such an embodiment, said rotor 22 surrounds at least partly said stator 21, wherein the shape of rotor 22 is adapted to match the shape of said first chamber 24.

Coupling means are adapted to couple rotor 21 of electric motor 20 to an input shaft (31, 51) of a mechanical reducer (30, 50), so that the input shaft (31, 51) of the mechanical reducer (30, 50) is dragged in rotation by rotor 22 of electric motor 20, preferably in such a way as to transmit a torque. In one possible embodiment, said coupling means are implemented on rotor 22. In such an embodiment, rotor 22 has a splined hub into which at least one input shaft (31, 51) of a mechanical reducer (30, 50) is engaged. In alternative embodiments, said coupling means are implemented through at least one key inserted between rotor 21 of the electric motor 20 and an input shaft (31, 51) of a mechanical reducer (30, 50). Alternative embodiments of the coupling means that allow the transmission of motion from electric motor 20 to the mechanical reducer (30, 50) should be considered to be included in the contents of the present description.

Said mechanical reducer (30, 50) is mounted coaxial to the axis of rotation 23, about which rotor 22 of electric motor 20 rotates.

Said mechanical reducer (30, 50) is equipped with an output shaft (36, 57) on which an excavation drum 13 engages, also mounted coaxial to axis of rotation 23.

Therefore, the mechanical reducer (30, 50) is interposed between electric motor 20 and excavation drum 13, and the same mechanical reducer (30, 50) is operationally connected to both electric motor 20 and excavation drum 13. Said mechanical reducer (30, 50) is adapted to transfer the rotary motion of electric motor 20 to excavation drum 13.

Excavation drum 13 is thus driven, in particular put in rotation, in a manner such that it receives a multiplied torque compared to that produced by electric motor 20 and turns at a reduced revolution speed compared to that of electric motor 20, in particular the revolution speed of rotor 22. This effect is ensured by the mechanical reducer (30, 50) interposed between electric motor 20 and excavation drum 13. Said mechanical reducer (30, 50) comprises at least one reduction stage.

In the exemplary but non-limiting construction variant of FIG. 3, electric motor 20 is connected to two mechanical reducers 30, each one having preferably a single reduction stage. Mechanical reducers 30, illustrated in FIG. 3, are cycloidal drives. Therefore, in one possible embodiment of excavation tool 3 according to the present invention, said at least one mechanical reducer 30, adapted to transfer the rotary motion and the torque from electric motor 20 to said at least one excavation drum 13, is of the cycloidal type.

Said two mechanical reducers 30 are mounted coaxial to the axis of rotation 23, about which both rotor 22 of said electric motor 20 and excavation drum 13 rotate.

Figure 5:
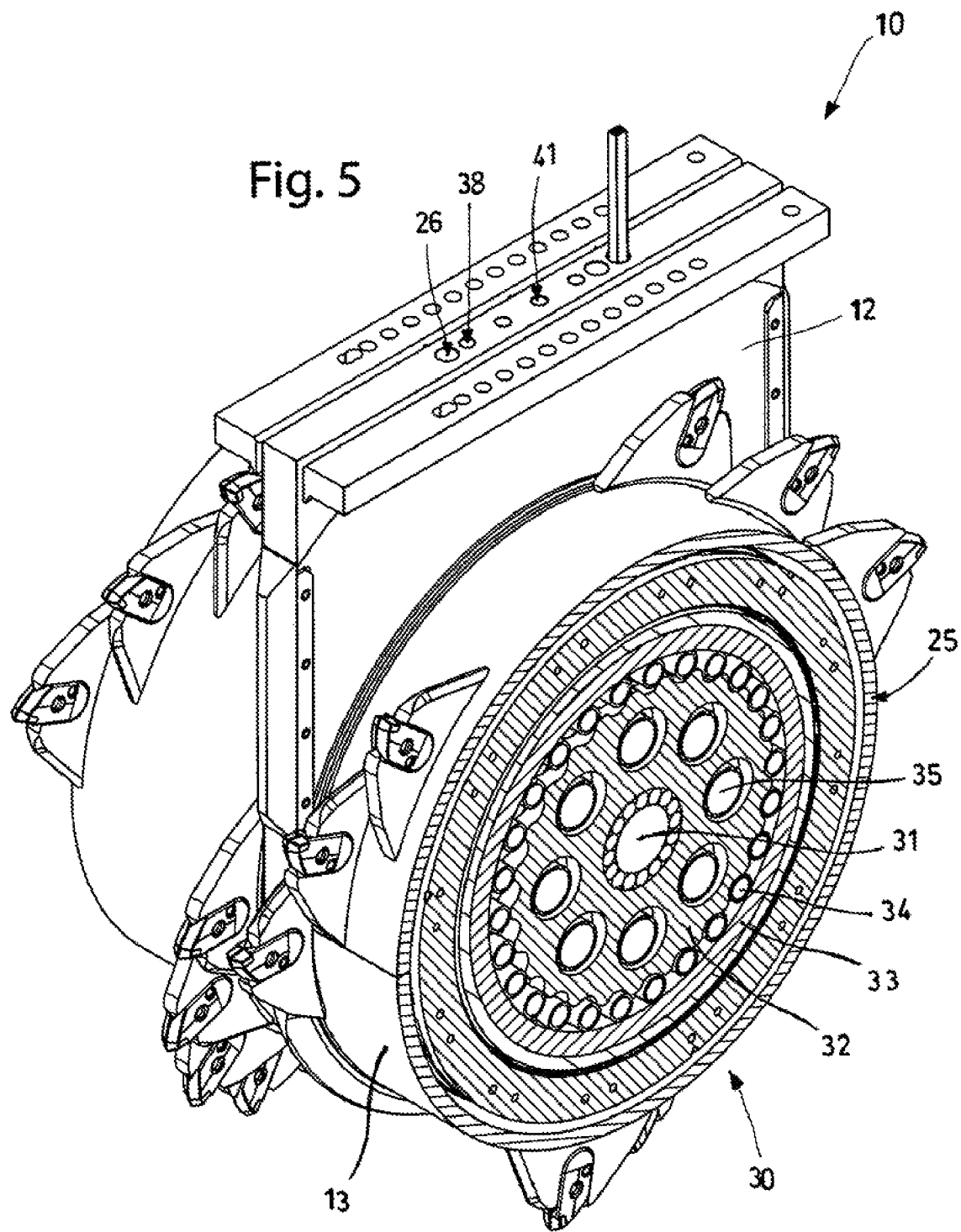
FIG. 5 is a perspective view, sectioned along a vertical plane, of a portion of a mechanical reducer of a cutting head of the excavation tool according to the present invention.

Said two mechanical reducers 30 are arranged on opposite sides relative to electric motor 20, so that electric motor 20 is positioned between the two mechanical reducers 30. Each cycloidal mechanical reducer 30 comprises an input shaft 31, which is connected to rotor 22 of electric motor 20 to receive a rotary motion and a torque. Input shaft 31 has an eccentric part, i.e. a cylindrical zone offset relative to the axis of rotation of the shaft itself. On the eccentric part of input shaft 31 one or more cycloidal discs 32 are mounted. Said one or more cycloidal discs 32 are mounted on the input shaft 31 by means of bearings. Such bearings allow the cycloidal discs 32 to turn idle relative to input shaft 31. Each cycloidal disc 32 has a profile with external lobes on its outer circumference. The external lobes of each cycloidal disc 32 engage with lobes of an internal profile of at least one internal-lobe ring 33. Said at least one internal-lobe ring 33 is integral with frame 12 that supports excavation drums 13; therefore, said at least one internal-lobe ring 33 does not turn, and remains stationary. In the preferred but non-limiting embodiment, as shown by way of example in FIGS. 3-5 and 7, the internal lobes of internal-lobe ring 33 may be implemented as rollers 34, also called ring pins, arranged angularly equidistant on the internal circumference of internal-lobe ring 33 and constrained thereto. Cycloidal discs 32, pushed by the motion of the eccentric part of input shaft 31 and guided by the engagement with rollers 34 of internal-lobe ring 33, are driven in an eccentric, cycloidal motion. The number of internal lobes of internal-lobe ring 33 or, likewise, the number of rollers 34 of internal-lobe ring 33, is greater than the number of external lobes of cycloidal discs 32. In particular, the ratio between the number of internal lobes of internal-lobe ring 33 and the number of external lobes of cycloidal discs 32 determines the reduction ratio of cycloidal mechanical reducer 30. Each cycloidal disc 32 has seats, e.g. holes, into which protrusions 35, e.g. pins or rollers, engage, which are adapted to allow transmission of the torque to an output shaft 36. Such protrusions 35, comprising bushings or rollers, are integral with output shaft 36 of cycloidal mechanical reducer 30, and cross cycloidal discs 32 while remaining in contact with the inner walls of the seats, e.g. holes, of cycloidal discs 32. Protrusions 35, e.g. pins, are then dragged by the motion of cycloidal discs 32 and transmit a rotation and a torque to output shaft 36 of cycloidal mechanical reducer 30. In FIG. 5 one can easily see that protrusions 35, implemented as pins, have a smaller diameter than the seats, implemented as holes, of cycloidal discs 32, thus allowing cycloidal discs 32 to move in a cycloidal motion. Such a conformation is also useful to prevent said cycloidal motion from being transferred to output shaft 36. Only a rotary motion is transferred to output shaft 36. output shaft 36 of the cycloidal mechanical reducer 30 outputs a multiplied torque compared to that received by cycloidal mechanical reducer 30 from electric motor 20, and outputs a reduced revolution speed compared to that received by the cycloidal mechanical reducer 30 from electric motor 20.

Excavation drum 13 is installed on the output shaft 36 of cycloidal mechanical reducer 30. Said excavation drum 13 is installed on output shaft 36 in such a way that said excavation drum 13 will turn integrally with output shaft 36 of mechanical reducer 30. The connection between output shaft 36 and excavation drum 13 may occur via coupling means. In one possible embodiment of the coupling means, the terminal part of output shaft 36 may have a prismatic shape, e.g. square, hexagonal, etc. Likewise, within excavation drum 13 a prismatic cavity may be formed, the shape of which is complementary to that of output shaft 36, so that excavation drum 13, once installed, will effect a shape coupling with output shaft 36. The shape coupling thus obtained will allow the transmission of rotation and torque. Alternative embodiments of the coupling means, equally suitable for ensuring the transmission of rotation and torque from output shaft 36 to excavation drum 13 should be considered to be included in the contents of the present patent application.

Figure 7:
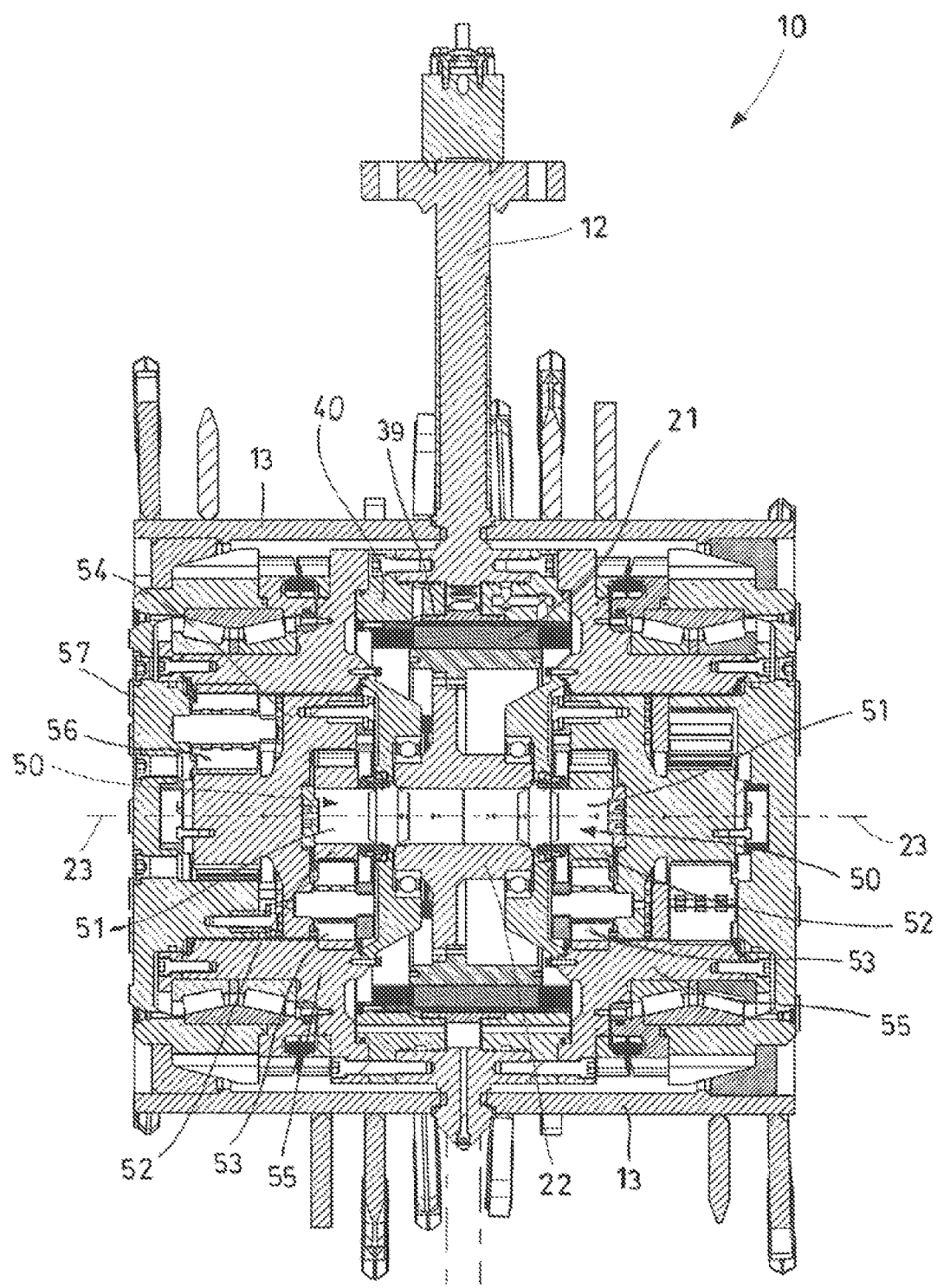
FIG. 7 is a sectional view of a portion of the cutting head of the excavation tool according to a construction variant of the present invention.
Figure 8:
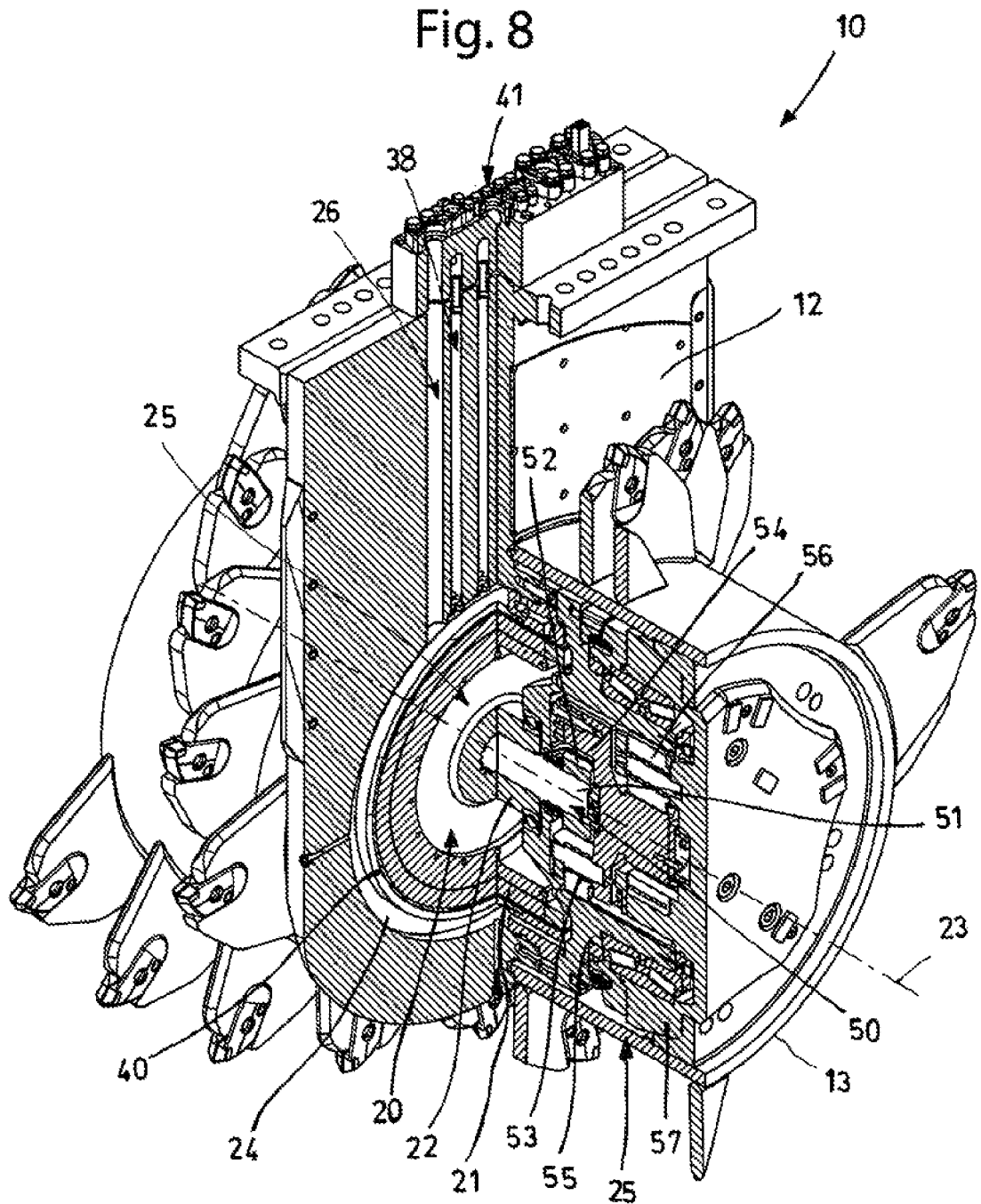
FIG. 8 shows a perspective view, partially sectioned along a vertical plane, of the cutting head of the excavation tool according to the variant of FIG. 7.

FIGS. 7 and 8 show a construction variant of cutting head 10 according to the present invention.

In the present embodiment, a mechanical reducer 50 of the epicycloidal or epicycloidal-gearing type is comprised, which is interposed between electric motor 20 and excavation drum 13. Said epicycloidal mechanical reducer 50 is operationally connected to electric motor 20 and to excavation drum 13 in order to transfer the rotary motion of electric motor 20 to excavation drum 13. Therefore, in one possible embodiment of excavation tool 3 according to the present invention, said at least one epicycloidal mechanical reducer 50, adapted to transfer the rotary motion and the torque from electric motor 20 to said at least one excavation drum 13, is of the epicycloidal type.

In this embodiment as well, epicycloidal mechanical reducer is mounted coaxial to the axis of rotation 23 about which rotor 22 of electric motor 20 rotates. Epicycloidal mechanical reducer 50 is also equipped with an output shaft 57 whereon an excavation drum 13 engages, also mounted coaxial to the axis of rotation 23.

In the construction variant of FIG. 7 and FIG. 8, electric motor 20 is connected to two mechanical reducers 50 of the epicycloidal-gearing type, preferably with two reduction stages. Said mechanical reducers 50 are mounted coaxial to the axis of rotation 23 and are arranged on opposite sides relative to electric motor 20, so that electric motor 20 is positioned between the two mechanical reducers 50. Each epicycloidal mechanical reducer 50 comprises an input shaft 51. Said input shaft 51 is connected to rotor 22 to receive a rotary motion and a torque. To the end of input shaft 51 a pinion 52 is fixed, which acts as a sun gear of a first reduction stage, meshing with the first planet gears 53 of the first stage installed on a first planet carrier 54. The first planets 53 engage with a crown gear with internal teeth 55, thus causing the first planet carrier 54 of the first stage to rotate. On the first planet carrier 54 a pinion is formed, which is coaxial to the axis of rotation 23 about which rotor 22 of electric motor 20 rotates. Said pinion formed on the first planet carrier 54 constitutes the sun gear of a second reduction stage. Said pinion is adapted to mesh with second planet gears 56 of the second stage. Said second planet gears 56 of the second stage are mounted on a second planet carrier 57 of the second stage. Said second planet gears 56 are adapted to engage with a crown gear with internal teeth. In one possible exemplary but non-limiting embodiment, said crown gear with internal teeth with which said second planet gears 56 engage is the same crown gear with internal teeth 55 with which said first planet gears 53 engage.

Said second planet gears 56, being engaged with a crown gear with internal teeth, allow second planet carrier 57 to be put in rotation. Second planet carrier 57 constitutes also the output shaft of the second reduction stage of epicycloidal mechanical reducer 50, i.e. the output shaft of epicycloidal mechanical reducer 50. To output shaft 57 excavation drum 13 is constrained, which is put in rotation by epicycloidal mechanical reducer 50.

Figure 6:
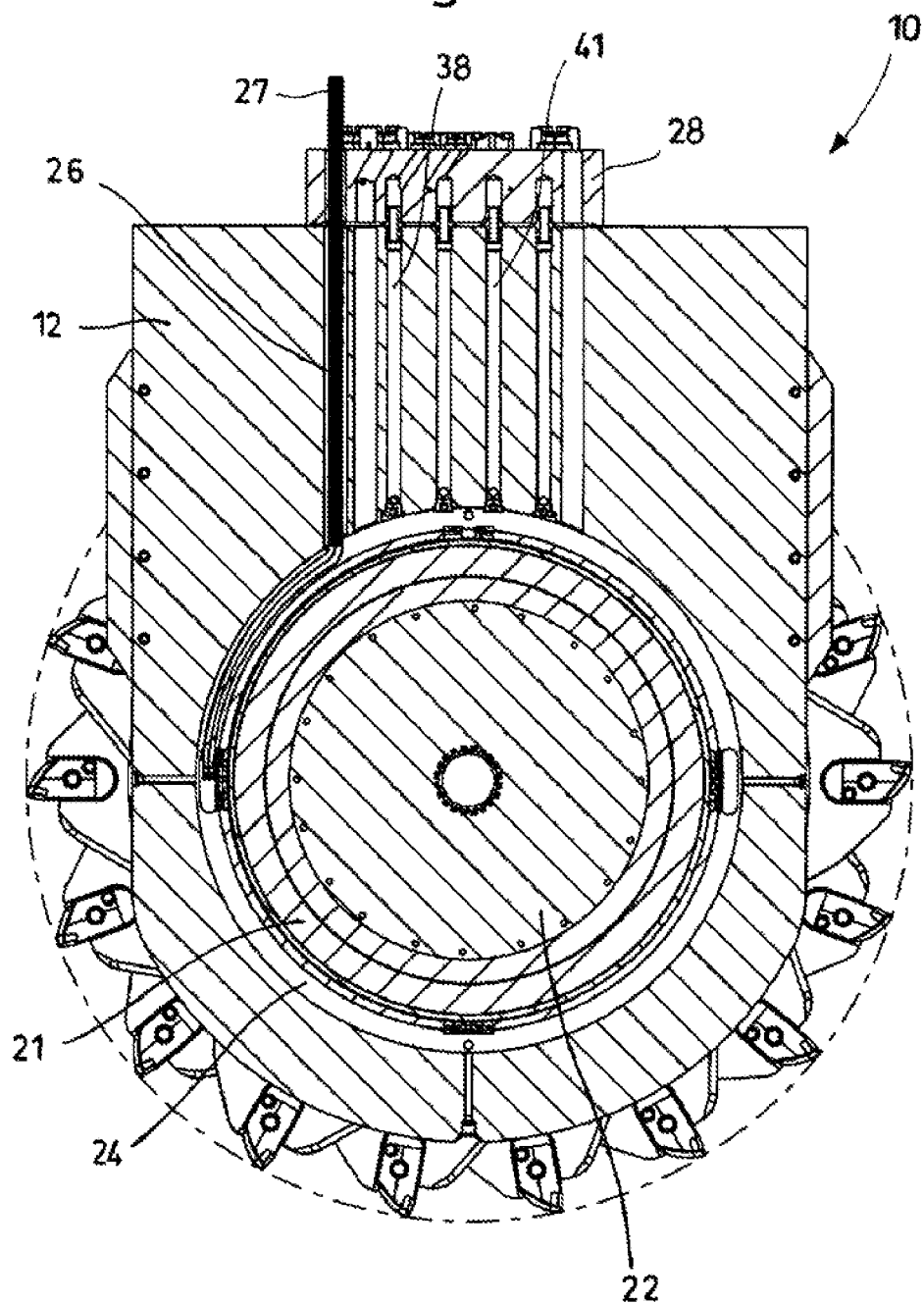
FIG. 6 shows a side view, sectioned along a vertical plane, of a cutting head of the excavation tool according to the present invention.

Excavation tool 3 according to the present invention, as shown by way of example in FIG. 6, preferably comprises at least one internal duct 26, hereafter referred to as electric power duct 26, adapted to allow at least one electric cable 27 to pass through. Said at least one electric cable 27, inserted in said electric power duct 26, allows supplying power to electric motor 20 of cutting head 10, i.e. allows supplying electric current to the windings of stator 21 of electric motor 20 installed in frame 12. In the preferred but non-limiting embodiment, said electric power duct 26 allows electric cables to pass through. Electric power duct 26 preferably extends from the top surface of frame 12, i.e. from the region where it couples to connection structure 11, to the first chamber 24 that houses electric motor 20. Preferably, said electric power duct runs through the trunk of frame 12. Within electric power duct 26 at least one electric cable or another conductor element can be inserted, which can reach suitable connectors for connecting to stator 21 of electric motor 20, in order to supply electric energy to electric motor 20. This technical solution allows protecting electric cables 27, preventing them from exposition to the excavation fluid and/or detritus, while also avoiding the risk of wear and/or preventing electric cables 27 from getting entangled and/or breaking during the excavation phases. Furthermore, this solution optimizes the occupied spaces, avoiding the additional space occupation of conduits external to frame 12.

The upper end of electric power duct 26, facing towards connection structure 11, can be covered with a flange body 28. Said flange body 28 is advantageously fitted with gaskets to prevent the excavation fluid from penetrating into the inner ducts, e.g. electric power ducts 26. Said flange body 28 further comprises internal passages or channels ending into suitable flanges for connecting flexible tubes in which the electric cables or conductor elements 27 can run. The at least one electric cable 27, after having run through electric power duct 26, can go through flange body 28 and then continue, preferably within a flexible tube, towards other devices comprised in excavation tool 3, e.g. an inverter 29, according to the present invention.

In a preferred but non-limiting embodiment, said excavation tool 3 according to the present invention further comprises at least one inverter 29 adapted to control said electric motor 20.

In a preferred but non-limiting embodiment, said excavation tool 3 according to the present invention further comprises at least one encoder 37 adapted to detect the position of a rotor 22, the latter being comprised in electric motor 20. In particular, said at least one encoder 37 is adapted to detect the angular position of a rotor 22.

Even more preferably, said at least one encoder 37 is adapted to send at least one electronic signal to at least one inverter 29. Said electronic signal is indicative of the angular position of said rotor 22 relative to stator 21 of motor 20.

Preferably, the at least one electric cable 27, adapted to supply power to said electric motor 20, reaches inverter 29. Said inverter 29, performing the function of controlling and monitoring the operation of electric motor 20, can control the revolution speed and the torque output of electric motor 20. Said inverter 29 controls electric motor 20 by appropriately energizing some windings or coils of stator 21 according to a specific timing, as a function of the position taken by rotor 22 relative to the windings or coils of stator 21. The angular position and the revolution speed of rotor 22 of electric motor 20 can be detected by means of an encoder 37, preferably of the rotary type.

Said inverter 29 is in turn controlled by a control unit, e.g. comprised in base machine 2, which can execute a computer program or software suitably compiled for controlling inverter 29.

Said encoder 37 is preferably installed within cutting head 10, as shown by way of example in FIG. 3. In the exemplary but non-limiting embodiment shown in FIG. 3, encoder 37 comprises two parts, each one having a ring-like shape, which can mutually rotate. Encoder 37 is mounted coaxial to the axis of rotation 23 about which rotor 22 of electric motor 20 rotates. Said encoder 37 is interposed between rotor 22 and a fixed wall that supports electric motor 20. One part of encoder 37, e.g. a ring, is constrained to rotor 22, whereas the other part, e.g. another ring, is constrained to a fixed part, e.g. the case of stator 21 of electric motor 20, so that the relative motion of the parts, e.g. said rings, will correspond to the revolution speed of rotor 22.

Preferably, said frame 12 comprises at least one internal duct 38, hereafter referred to as signal transmission duct 38, adapted to allow cables to pass through. Such cables are adapted to allow the transmission of at least one electronic signal coming from one or more sensors installed in excavation tool 3, e.g. in cutting head 10.

Such sensors may be of different kinds, such as, for example, pressure sensors, temperature sensors, revolution speed sensors, etc., e.g. said encoder 37. The at least one signal transmission duct 38 preferably extends from the top surface of frame 12, i.e. from the region where it couples to connection structure 11, and then reaches one or more chambers which house one or more sensors comprised in excavation tool 3, in particular arranged inside cutting head 10. Preferably, said signal transmission duct 38 runs through the trunk of frame 12. This solution optimizes the occupied spaces, avoiding the space occupation that would be caused by any additional conduits external to frame 12, in addition to protecting the cables arranged within said duct.

The signal generated by encoder 37 is transmitted to inverter 29 via cables suitable for signal transport which, starting from the encoder, run within at least one signal transmission duct 38 that is present in frame 12.

Inverter 29 is electrically connected, e.g. by means of electric cables, to a source of electric current. Said inverter is adapted to appropriately control and distribute the electric current received from the source of electric current towards electric motor 20. The electric current supplied to electric motor 20 is such that the desired revolution speed and torque will be obtained from the motor.

Generally, the source of electric current for inverter 29 consists of an electric power unit 18, also referred to as electric power-pack. Said electric power unit 18 is preferably installed aboard base machine 2, as shown by way of example in FIG. 2. Said electric power unit 18 generally comprises: a power motor, e.g. a Diesel engine; a current generator driven by said power motor, and a tank for the fuel to be used by the power motor.

In one possible embodiment, said base machine 2 comprises an electric power unit 18 adapted to supply power to at least one brushless electric motor (20, 44) comprised in excavation tool 3.

In an alternative embodiment (not shown), said electric power unit 18, adapted to supply electric current to inverter 29, is an electric power distribution network, e.g. the electric network available on the excavation site.

In one possible embodiment, said base machine 2 comprises elements adapted to allow the excavation equipment to be connected to an electric power distribution network for supplying power to excavation tool 3.

In an exemplary but non-limiting embodiment of excavation tool 3 according to the present invention, inverter 29 is preferably installed on load-bearing frame 9 of excavation tool 3. Even more preferably, said inverter 29 is housed inside a watertight chamber comprised in load-bearing frame 9, as shown by way of example in FIG. 2A. In this latter embodiment, inverter 29 can solidly follow the movement of excavation tool 3, since it is housed in a watertight chamber and can be immersed in the excavation fluid.

In the preferred embodiment, said at least one inverter 29, adapted to control said at least one electric motor 20, is housed in a watertight chamber. Said watertight chamber is provided directly on load-bearing frame 9 of excavation tool 3 according to the present invention.

In general, the number of inverters 29 comprised in an excavation tool 3 according to the present invention is at least equal to the number of electric motors comprised in the same excavation tool 3, even more preferably to the number of brushless electric motors 20. Preferably, in excavation tool 3 according to the present invention, as many inverters are installed inside the watertight chamber as the number of brushless electric motors comprised in excavation tool 3. With this technical solution, each brushless electric motor is controlled by a respective inverter 29, preferably a specially dedicated one.

The installation of the at least one inverter 29 on load-bearing frame 9 of excavation tool 3 allows minimizing the distance from the respective electric motor 20, thereby reducing any electromagnetic interferences and/or parasitic impedances caused by the cables along which the electric and/or electronic current runs as well as any voltage drops, thus ensuring a better operation of inverter 29 and of electric motor 20. In the implementation solution wherein inverter 29 is installed on excavation tool 3, the connection of inverter 29 to electric power unit 18 installed on base machine 2 is effected by means of electric cables running within supporting and guiding devices 16 adapted to support and guide the power lines of excavation tool 3. Such supporting and guiding devices 16 are adapted to contain at least cables, e.g. electric cables, and are wound on or unwound from a first reel 17, installed on base machine 2, in order to follow the movement of excavation tool 3 during the excavation and/or lift phases. Such supporting and guiding devices 16 may contain piping for several purposes, mainly aimed at ensuring the proper operation of excavation tool 3.

In general, the supporting and guiding devices 16 according to the present invention contain no hydraulic piping because, instead of using hydraulic motors, excavation tool 3 according to the present invention uses brushless electric motors. The elimination of the hydraulic hoses allows overcoming numerous problems suffered by the prior art, as previously specified.

In an exemplary but non-limiting alternative variant implementation, the at least one inverter 29 may be installed on base machine 2 and connected to the motors by means of suitable power lines, e.g. electric cables, connecting excavation tool 3 to base machine 2. In this case, inverter 29 will always remain outside the pit and, since it will never come in contact with the excavation fluid, does not need to be protected by a watertight chamber. In this case, every inverter 29 will be closer to the source of electric energy, e.g. electric power unit 18. In this embodiment, the cables that supply electric power from an inverter 29 to an electric motor 20, comprised in cutting head 10 of excavation tool 3, in addition to the cables adapted for conducting the electronic signals generated by the sensors, e.g. the signal from encoder 37 of each electric motor to respective inverter 29, will have to run within the supporting and guiding devices 16, so that they can follow the motion of tool 3 in the pit, while being wound on and unwound from the first reel 17.

In general, excavation tool 3 is configured in such a way that, advantageously, the at least one brushless electric motor 20, adapted to put in rotation said at least one excavation drum 13, can be cooled, for the purpose of further improving the efficiency and reliability of electric motor 20 itself.

The cooling of electric motor 20 is preferably effected by means of a cooling circuit in which at least one cooling fluid circulates.

Excavation tool 3 according to the present invention comprises, at least partly, a cooling circuit.

In particular, at least a part or portion of the cooling circuit is comprised in excavation tool 3 according to the present invention.

In a preferred but non-limiting embodiment, said excavation tool 3 comprises a cooling chamber 39. Said cooling chamber 39 is comprised in the portion of cooling circuit comprised in excavation tool 3.

Said cooling chamber 39 is adapted to allow cooling electric motor 20.

Preferably, said frame 12 comprises a cooling chamber 39, adapted to allow cooling said at least one electric motor 20.

In a preferred but non-limiting embodiment of excavation tool 3, as shown by way of example in FIGS. 3, 4 and 6, within frame 12 there is a cooling chamber 39, adapted to allow cooling electric motor 20. In this embodiment, stator 21, preferably cylindrical in shape, of electric motor 20 is surrounded by a containment ring 40, preferably made of metal. Said containment ring 40 is also contained in the first chamber 24 in which electric motor 20 is housed. Containment ring 40 has, at least in a section thereof, an inside diameter that is slightly greater than that of stator 21. Said containment ring 40 thus allows creating an interspace between the walls of the first chamber 24 and the outer walls of stator 21. Said interspace constitutes the above-mentioned cooling chamber 39. Said containment ring 40, preferably in addition to having, at least in a section thereof, a greater inside diameter, also has lateral edges or lips having a smaller diameter, which constitute the side walls of cooling chamber 39.

In general, cooling chamber 39 surrounds electric motor 20 and preferably surrounds stator 21. In a further embodiment, cooling chamber 39 may go through stator 21. Being properly insulated, said cooling chamber 39 allows the circulation of a cooling fluid within the volume defined by it, without the same cooling liquid being allowed to reach rotor 22 of electric motor 20, so as to prevent any direct contact between the cooling fluid and rotor 22. Circulation of the cooling fluid within cooling chamber 39 preferably occurs through inlet and outlet ducts formed in containment ring 40.

Said cooling fluid is, for example, a mixture of water and glycol or hydraulic oil or any other fluid suitable for this purpose. For example, the cooling fluid may also be compressed air or another gaseous mixture delivered, for example, into cooling chamber 39 through a compressor, preferably installed on the machine base.

As shown in FIG. 6, in order to allow the cooling of brushless electric motor 20 comprised in cutting head 10 of excavation tool 3 according to the present invention, i.e. in order to be able to supply a cooling fluid towards said electric motor 20, in frame 12 there is at least one internal duct 41 which is adapted to allow a cooling fluid to pass, whether directly or through piping, for cooling at least one electric motor 20. Said internal duct 41 is preferably fluidically connected to said cooling chamber 39. Internal duct 41, hereafter referred to as cooling fluid duct 41, preferably extends from the top surface of frame 12, i.e. from the region where it connects to connection structure 11, and reaches containment ring 40 and cooling chamber 39 by flowing through the trunk of frame 12.

This solution optimizes the occupied spaces, avoiding the additional space occupation that would be caused by any conduits external to frame 12, in addition to protecting the tubes arranged in said duct.

In one possible embodiment, said cooling fluid duct 41 does not arrive directly at cooling chamber 39, since there may be a series of internal passages and ports in containment ring 40. For example, in FIG. 6 it is possible to see a cooling fluid duct 41 having obstruction and bifurcation elements that provide separation from the first chamber 24, in which electric motor 20 is housed, and connection to transverse ducts.

In a preferred embodiment, which can further improve the cooling of electric motor 20, cooling fluid ducts 41 are preferably at least two. In particular, at least one cooling fluid duct 41 is used for the delivery of the cooling fluid, and at least one cooling fluid duct 41 is used for the return of the cooling fluid.

In general, the outer surface of stator 21 of electric motor may have grooves to increase the heat exchange area. Preferably, such grooves screw around stator 21 like a thread, so as to increase the exchange area while at the same time causing the cooling fluid to make multiple turns around stator 21 before exiting cooling chamber 39.

In general, excavation tool 3 according to the present invention comprises, at least partly, a cooling circuit adapted to cool said at least one electric motor 20. Said cooling circuit comprises a refrigerating device 42 and a recirculation pump, or a compressor, appropriately connected to hoses. Such hoses are adapted to mutually connect cooling chamber 39 and/or said cooling fluid duct 41, and possibly inverter 29, the recirculation pump and refrigerating device 42. One possible embodiment of the cooling circuit is shown by way of example in FIG. 2, wherein one can see refrigerating device 42, also referred to as chiller. Said refrigerating device 42 and the recirculation pump are preferably installed on base machine 2.

In excavation equipment 1 according to the present invention, said base machine 2 comprises said refrigerating device 42, wherein said refrigerating device 42 is connected to the cooling circuit adapted to cool at least one electric motor 20, and possibly at least one inverter 29, of excavation tool 3.

In the preferred but non-limiting embodiment, in the cooling circuit the cooling fluid exits refrigerating device 42 at a low temperature. Under the action of the recirculation pump, the cooling fluid exiting refrigerating device 42 is delivered to cutting head 10 via hoses comprised in the cooling circuit. Such hoses are arranged within supporting and guiding devices 16. The hoses of the cooling circuit arrive at flange body 28.

From flange body 28, the cooling fluid flows through an at least on internal duct or cooling fluid duct 41, whether directly or through pipes, and then goes through the trunk of frame 12 and reaches cooling chamber 39.

After having absorbed the heat of electric motor 20, the cooling fluid is pushed, under the action of the recirculation pump, through a further internal duct or cooling fluid duct 41 to return into a pipe of the cooling circuit and reaches inverter 29. In this manner, the fluid can also cool inverter 29. After having cooled inverter 29, the cooling fluid flows on within the hoses of the cooling circuit, which run inside supporting and guiding devices 16, until it arrives again at refrigerating device 42, preferably installed on base machine 2. As an alternative, after having cooled electric motor 20, the cooling fluid may directly arrive at refrigerating device 42 via hoses arranged within supporting and guiding devices 16, and a separate circuit may be provided for cooling inverter 29.

In general, once the hot cooling fluid has reached refrigerating device 42, it is cooled and recirculated in the cooling circuit.

In an exemplary but non-limiting alternative solution, the cooling fluid may follow the opposite path, i.e. exiting refrigerating device 42 at a low temperature and flowing first through inverter 29 and then through cooling chamber 39 of electric motor 20, prior to returning to refrigerating device 42 to be cooled again.

In a further variant, in particular a simpler variant, of the cooling circuit, the cooling fluid may, when exiting refrigerating device 42, be pumped towards inverter 29 and then, after having crossed cooling chamber 39 of electric motor 20, it may be dispersed in the excavation fluid, without envisaging the presence of a return circuit towards refrigerating device 42. In this latter embodiment, the cooling fluid is a non-polluting and biodegradable substance, e.g. the cooling fluid is a mixture of water and glycol.

Excavation tool 3 according to the present invention comprises a pump 14, preferably a submerged centrifugal pump. Said pump 14 is preferably secured to load-bearing frame 9 of excavation tool 3. Said pump 14 is adapted to suck in the detritus crushed by excavation drums 13 and convey it towards the surface together with the excavation fluid, the latter performing the function of stabilizing the pit walls, through the excavation fluid draining pipe 15. Pipe 15 is a flexible pipe starting from pump 14, to which it is connected, and running up along load-bearing frame 9, preferably prismatic in shape, of excavation tool 3. This arrangement is such that, at the upper end of load-bearing frame 9, pipe 15 is substantially coaxial to suspension element 7, which is preferably of the flexible type. Pipe 15 then runs parallel to suspension element 7, and follows a pulley placed at the top of arm 6 of base machine 2. Subsequently, pipe 15 is wound on a second reel 19 adapted to wind said pipe 15 for draining the excavation detritus. The pipe 15, adapted to drain the excavation fluid, can thus follow the motion of excavation tool 3 within the pit, being either wound on or unwound from the second reel 19. Said pump 14 is adapted to be driven by a dedicated electric motor 44. According to an innovative aspect of excavation tool 3 according to the present invention, electric motor 44 that drives pump 14 for suction of the excavation fluid is a brushless electric motor. Brushless electric motor 44 that drives pump 14 is also controlled by a dedicated inverter, which in turn is powered by a source of electric current, such as, for example, electric power unit 18 or the electric network of the site. In the preferred but non-limiting embodiment, also the inverter that controls brushless electric motor 44 that drives pump 14 is installed on load-bearing frame 9 of excavation tool 3, housed inside a watertight chamber. Even more preferably, also the inverter that controls brushless electric motor 44 is housed in the same watertight chamber that houses inverters 29 adapted to control electric motors 20 of excavation drums 13 of excavation tool 3 according to the present invention. As an alternative, the inverter that controls brushless electric motor may also be installed aboard base machine 2. Brushless electric motor 44 that drives pump 14 and its inverter may be appropriately connected, e.g. in series, to the cooling circuit already described herein, which comprises refrigerating device 42, so that they can also be cooled. In one possible exemplary but non-limiting embodiment, brushless electric motor 44 that drives pump 14 may be cooled in parallel with the at least one electric motor 20 housed in the first chamber 24, e.g. through a flow divider. Likewise, the inverter that controls brushless electric motor 44 that drives pump 14 may be cooled in parallel with the at least one inverter 29 that controls electric motors 20.

Also for brushless electric motor 44 of pump 14 and for associated inverter 29, the connection to electric power unit 18, preferably installed on base machine 2, is effected through electric cables running within supporting and guiding devices 16.

Excavation tool 3 according to the present invention may comprise a small hydraulic power unit 45, e.g. as shown in FIG. 2A. Said hydraulic power unit 45 is preferably secured to load-bearing frame 9 of excavation tool 3.

In general, said hydraulic power unit 45 is adapted to activate one or more flaps 46 for correcting the excavation direction. Flaps 46 consist of movable appendices, usually metal plates, hinged to load-bearing frame 9 and movable through actuators driven by said power unit. Each flap 46 is arranged parallel to an outer face of the prismatic load-bearing frame 9. Such flaps 46, when activated, can press against the walls of the pit, thus applying a force onto load-bearing frame 9 of excavation tool 3, which allows deviating excavation tool 3 in order to correct the advance direction in the pit. Preferably, the hydraulic power unit 45 comprises a tank for the activation fluid, e.g. hydraulic oil; a hydraulic pump, driven by an electric motor; a distributor or valves for controlling one or more actuators for actuating said flaps 46.

Preferably, said hydraulic power unit 45 comprises connection pipes between said tank and said one or more actuators, e.g. actuation cylinders. Since the cylinders that actuate flaps 46 have very short strokes, they require a small amount of activation fluid, e.g. oil, so that a small tank will suffice, included in hydraulic power unit 45 mounted aboard excavation tool 3. Therefore, it is not necessary to use any piping for the hydraulic connection between excavation tool 3 and a tank, e.g. for oil, installed on base machine 2, in order to supply the activation fluid to the actuators of flaps 46. Likewise, the pump of hydraulic power unit 45 does not require a hydraulic connection to the base machine, in that it is driven by an electric motor. It will therefore suffice to connect hydraulic power unit 45 to base machine 2 by means of electric cables that can be routed within the supporting and guiding devices 16.

In one variant, the activation fluid used for moving the actuation cylinders of flaps 46 may advantageously be a mixture of water and glycol, as opposed to hydraulic oil, in order to avoid any contamination of the bentonite mud by hydraulic oil.

The use of electric motors (20, 44), in particular of the brushless type, for driving the devices comprised in excavation tool 3, such as, for example, excavation drums 13, and for driving pump 14 for draining the excavation fluid, allows for complete elimination of the hydraulic connections for transmission of oil between excavation tool 3 and base machine 2. The transmission of energy between excavation tool 3 and base machine 2, or between the tool and another power source outside the pit, e.g. the electric network, occurs only electrically, and this ensures a huge reduction of the energy losses occurring in the transmission from the machine to the tool or from the power source to the tool.

Compared to a known excavation equipment 100 with a hydraulic power unit on base machine 102 and a hydraulic connection to excavation tool 103, the power installed on base machine 2 being equal, a much greater amount of energy can be made to reach the wheel-driving motors. This translates into higher efficiency and productivity of tool 3, resulting in faster excavation progress.

In prior-art excavation equipment with hydraulic pipes between the excavation tool and the base machine, because the pipes are immersed in the excavation fluid to follow the motion of the tool, fluid infiltrations may occur inside the pipes. Such infiltrations involve pollution of the oil, which will lose its lubricating properties. As is well known, the loss of lubricating properties leads to seizure of the pumps or other hydraulic components comprised in prior-art excavation equipment.

In the solution of the present invention, within supporting and guiding devices 16, adapted to support and guide the power lines connecting excavation tool 3 to base machine 2, the following can be inserted: electric cables for supplying power to the electric motor (20, 44), preferably of the brushless type; signal cables for controlling electric motors 20 and detecting data about excavation tool 3; pipes for circulating the fluid for cooling the electric devices, such as the brushless electric motors and the inverters, installed on excavation tool 3. The present solution thus allows eliminating the hydraulic pipes comprised in prior-art solutions, in particular the hydraulic pipes within the supporting and guiding devices.

Brushless motors are advantageous, compared to other types of electric motors, also when used in excavation equipment and excavation tools. Thanks to the large number of stator poles, brushless motors can output high torque values at low rpm. This effect is further increased via integration of encoders into the brushless motors and inverter-based control.

In addition, brushless motors do not suffer from hysteresis problems that are typical of the other electric motors, and can therefore be applied to excavation tools.

Furthermore, brushless motors are motors capable of operating at revolution speeds of less than 1,000 rpm with a constant torque, and for this reason they are called slow motors. In addition, the overall dimensions and weights of the motor and mechanical reducer used in the present invention are comparable to those of a hydraulic motor currently employed in cutting heads, the performance thereof being substantially similar.

A significant advantage is attained by controlling the brushless motors. By controlling the brushless motors by means of an inverter, in turn controlled via software by a control unit, it is possible to automatically manage the torque and speed of the excavation drums. Due to this feature, it is possible to adjust the excavation parameters as a function of the type of soil encountered, allowing for instantaneous optimization of the performance of excavation tool 3. This advantage can be achieved through the feedback of the data obtainable from the sensors comprised in excavation tool 3. The control of inverter 29 makes it possible to actively respond to variations in the characteristics of the material to be excavated in very short times, so as to able to appropriately adjust the global performance of the excavation equipment. Furthermore, since it has no sliding brushes, a brushless motor is subject to much less wear, resulting in reduced maintenance and a considerable economical advantage.

The use of mechanical reducers, in particular cycloidal reducers, largely increases the overall efficiency of the excavation tool, leading to considerable energy savings. The cycloidal mechanical reducers allow for single-stage torque transmission with reduction ratios up to a hundred to one. This freedom in designing the mechanical reducers allows choosing among a wider range of brushless electric motors when designing the excavation tool and/or the excavation equipment. In fact, it will be possible to choose among a wide range of brushless motors, each one characterized by a different output revolution speed, to which a different cycloidal mechanical reducer can be coupled, resulting in higher performance and lower total costs of the excavation tool and of the associated excavation equipment. By way of example, it will be possible to select a brushless electric motor with a revolution speed above 900 rpm, and then reduce the speed by means of a higher reduction ratio of the cycloidal mechanical reducer, or to select a slower motor and design a cycloidal mechanical reducer with a lower reduction ratio.

The adoption of cycloidal mechanical reducers provides resistance to overloads, particularly instantaneous or brief overloads, up to five times the rated load, thus ensuring higher robustness, reliability and performance compared to the reducers that have been commonly used until now in diaphragm excavation tools.

A further advantage of cycloidal mechanical reducers applied to excavation tools is that, since they have no sliding parts, they are less subject to wear and therefore require less frequent maintenance compared to the mechanical reducers used in the prior art.

The presence of a fluid cooling circuit for the electric motors and/or for the respective inverters installed on excavation tool 3, according to the present invention, allows further improving the overall efficiency of the excavation tool and the performance of the entire excavation equipment during an excavation.

The realization of ducts within the trunk of frame 12 provides space optimization and allows protecting the electric and signal cables and the cooling pipes at cutting head 10.

While obtaining the same desired power at excavation drums 13, the better efficiency of the brushless electric motors makes it possible to install on base machine 2 an electric power unit that is smaller than a hydraulic power unit comprised in prior-art solutions, thus ensuring less environmental and noise pollution.

REFERENCE NUMERALS

Excavation equipment 1
Base machine 2
Excavation tool 3
Tracked undercarriage 4
Turret 5
Arm 6
Flexible element 7
Draw-works 8
Load-bearing frame 9
Cutting head 10
Connection structure 11
Frame 12
Excavation drum 13
Pump 14
Pipe 15
Supporting and guiding devices 16
First reel 17
Electric power unit 18
Second reel 19
Electric motor 20
Stator 21
Rotor 22
Axis of rotation 23
First chamber 24
Second chamber 25
Electric power duct 26
Electric cable or conductor element 27
Flange body 28
Inverter 29
Cycloidal mechanical reducer 30
Input shaft 31
Cycloidal discs 32
Internal-lobe ring 33
Rollers 34
Protrusions (pins or rollers) 35
Output shaft 36
Encoder 37
Signal transmission duct 38
Cooling chamber 39
Containment ring 40
Cooling fluid duct 41
Refrigerating device 42
Brushless electric motor 44
Hydraulic power unit 45
Flaps 46
Epicycloidal mechanical reducer 50
Input shaft 51
Pinion 52
First planet gears 53
First planet carrier 54
Crown gear with internal teeth 55
Second planet gears 56
Second planet carrier or output shaft 57
Known excavation equipment 100
Base machine 102
Excavation tool 103
Tracked undercarriage 104
Turret 105
Arm 106
Flexible suspension element 107
Draw-works 108
Prismatic load-bearing frame 109
Cutting head 110
Frames 112
Excavation drums 113
Submerged suction pump 114
Mud pipe 115
Supporting and guiding devices 116
Reel 117
Hydraulic power unit 118

The invention claimed is:

1. An excavation tool for making ground excavations for panels and diaphragms, said excavations containing excavation fluid or stabilizing mud during execution of the excavations, said excavation tool being configured for immersing in the excavation fluid or stabilizing mud during execution of the excavations; the excavation tool comprising:

at least one rotary excavation drum;

at least one frame, adapted to support said at least one excavation drum;

at least one suction pump, adapted for suction of the excavation fluid or stabilizing mud and detritus present in the excavation fluid or stabilizing mud;

at least one brushless electric motor, adapted to put in rotation said at least one excavation drum;

at least one mechanical reducer, operationally connected to said at least one brushless electric motor and said at least one excavation drum;

said at least one brushless electric motor being installed in said frame and being coaxial to said at least one excavation drum;

said at least one mechanical reducer coaxial to said at least one brushless electric motor and said at least one excavation drum;

said at least one mechanical reducer being adapted to transfer rotary motion from said at least one brushless electric motor to said at least one excavation drum.

2. The excavation tool according to claim 1, further comprising:

at least one inverter adapted to control said at least one brushless electric motor.

3. The excavation tool according to claim 1, further comprising:

at least one encoder adapted to detect the position of a rotor, said rotor being comprised in the brushless electric motor;

said at least one encoder being adapted to send at least one electronic signal to at least one inverter comprised in the excavation tool;

said electronic signal being indicative of an angular position of said rotor relative to a stator of the brushless electric motor.

4. The excavation tool according to claim 1, wherein at least one inverter, adapted to control said at least one brushless electric motor, is housed in a watertight chamber;

said watertight chamber being directly mounted on a load-bearing frame comprised in the excavation tool.

5. The excavation tool according to claim 1, wherein the frame comprises a cooling chamber adapted to circulate a cooling fluid for allowing cooling of said at least one brushless electric motor.

6. The excavation tool according to claim 1, wherein said suction pump, adapted for suction of the excavation fluid, is driven by at least one other brushless electric motor.

7. The excavation tool according to claim 1, wherein said at least one mechanical reducer, adapted to transfer the rotary motion and the torque from said at least one brushless electric motor to said at least one excavation drum, comprises a cycloidal reducer.

8. The excavation tool according to claim 1, wherein said at least one mechanical reducer, adapted to transfer the rotary motion and the torque from said at least one brushless electric motor to said at least one excavation drum, comprises an epicycloidal reducer.

9. The excavation tool according to claim 1, wherein said at least one frame comprises at least one internal duct adapted to allow at least one electric cable to pass through;

said at least one electric cable being adapted to supply power to said at least one brushless electric motor.

10. The excavation tool according to claim 1, wherein said at least one frame comprises at least one internal duct adapted to allow cables to pass through;

said cables being adapted to allow at least one electronic signal, coming from one or more sensors installed in the excavation tool to pass.

11. The excavation tool according to claim 1, wherein said at least one frame comprises at least one internal duct adapted to allow a cooling fluid, for cooling at least one electric motor, to pass through.

12. The excavation tool according to claim 1, comprising:

a load-bearing frame;

two cutting heads fixed below said load-bearing frame;

said cutting heads being arranged alongside each other;

each cutting head comprising a frame adapted to support two excavation drums;

said excavation drums are arranged on a same axis of rotation, opposite to each other with respect to the frame.

13. The excavation tool according to claim 1, comprising a hydraulic power unit adapted to activate one or more flaps for correcting an excavation direction;

said hydraulic power unit comprising:

a tank for the activation fluid;

a hydraulic pump, driven by an electric motor;

a distributor or valves for controlling one or more actuators for actuating said flaps.

14. Excavation equipment for making ground excavations for panels and diaphragms, comprising:

at least one excavation tool;

a base machine adapted to support said excavation tool, wherein said excavation tool is an excavation tool in accordance with claim 1.

15. The excavation equipment according to claim 14, wherein said base machine comprises a cooling device;

said cooling device being connected to a cooling circuit, in which a cooling fluid can circulate, adapted to cool at least one brushless electric motor or at least one inverter comprised in the excavation tool.

16. The excavation equipment according to claim 14, wherein the base machine comprises an electric power unit adapted to supply power to at least one brushless electric motor comprised in the excavation tool.

17. The excavation equipment according to claim 14, wherein the base machine comprises elements adapted to connect the excavation equipment to an electric power distribution network for supplying power to the excavation tool.

18. The excavation equipment according to claim 14, wherein said base machine comprises a cooling device; said cooling device being connected to a cooling circuit, in which a cooling fluid can circulate, adapted to cool at least one brushless electric motor and at least one inverter comprised in the excavation tool.

19. The excavation tool according to claim 1, wherein said brushless electric motor is a synchronous motor with permanent magnets.

20. The excavation tool according to claim 1, wherein said brushless electric motor comprises a stator and a rotor;

said stator comprising electric windings;

said rotor being coaxial to said stator and comprising permanent magnets.

21. The excavation tool according to claim 20, said inverter controlling said brushless electric motor by energizing windings or coils comprised in said stator, according to a specific timing, as a function of positions taken by said rotor, relative to said windings or coils of said stator.

22. The excavation tool according to claim 2, said inverter controlling said brushless electric motor by energizing windings or coils of a stator in the brushless electric motor, according to a specific timing, as a function of positions taken by a rotor of the brushless electric motor, relative to said windings or coils of the stator.

23. The excavation tool according to claim 1, wherein:
said excavation tool comprising:
- at least two rotary excavation drums, adapted to rotate about an axis or rotation;
- at least one brushless electric motor, adapted to put in rotation said at least two excavation drums;
- at least two mechanical reducers,
- said at least one brushless electric motor is connected to two mechanical reducers;
- said mechanical reducers are mounted coaxial to the axis of rotation and are arranged on opposite sides relative to said brushless electric motor so that brushless electric motor is positioned between two mechanical reducers;
- said brushless electric motor being coaxial to said at least two excavation drums;
- said at least two mechanical reducers being adapted to transfer rotary motion from said at least one brushless electric motor to said at least two excavation drums.

* * * * *